(12) United States Patent
Wong (10) Patent No.: US 11,560,189 B2
(45) Date of Patent: Jan. 24, 2023

(54) TRACK ELEMENTS FOR FORMING A CONTINUOUS OVER TYRE TRACK WITH STRENGTH ENHANCEMENT STRUCTURE

(71) Applicant: Chee Kong Wong, Semenyih (MY)

(72) Inventor: Chee Kong Wong, Semenyih (MY)

( * ) Notice: Subject to any disclaimer, the term of this patent is extended or adjusted under 35 U.S.C. 154(b) by 380 days.

(21) Appl. No.: 16/614,291

(22) PCT Filed: May 22, 2018

(86) PCT No.: PCT/MY2018/050033
§ 371 (c)(1),
(2) Date: Nov. 15, 2019

(87) PCT Pub. No.: WO2018/217076
PCT Pub. Date: Nov. 29, 2018

(65) Prior Publication Data
US 2021/0155303 A1 May 27, 2021

(30) Foreign Application Priority Data
May 23, 2017 (MY) ................................ 2017701877
May 21, 2018 (MY) ................................ 2018701949

(51) Int. Cl.
*B62D 55/20* (2006.01)
*B60C 27/20* (2006.01)
*B60C 27/12* (2006.01)
*B62D 55/04* (2006.01)
*B62D 55/205* (2006.01)

(52) U.S. Cl.
CPC ............ *B62D 55/202* (2013.01); *B60C 27/12* (2013.01); *B60C 27/20* (2013.01); *B62D 55/04* (2013.01); *B62D 55/205* (2013.01)

(58) Field of Classification Search
CPC ...... B62D 55/202; B62D 55/20; B62D 55/04; B62D 55/205; B60C 27/023; B60C 27/20
See application file for complete search history.

(56) References Cited

U.S. PATENT DOCUMENTS

| | | |
|---|---|---|
| 2,046,299 A | 6/1936 | Armington |
| 2,433,436 A | 12/1947 | Cook |
| 2,745,460 A | 5/1956 | Koenig |
| 4,089,565 A | 5/1978 | Loegering et al. |
| 4,408,646 A | 10/1983 | Forsyth |

(Continued)

FOREIGN PATENT DOCUMENTS

| | | | | |
|---|---|---|---|---|
| EP | 2569212 B1 * | 9/2014 | ............. | B62D 55/04 |
| WO | WO-2019016430 A1 * | 1/2019 | ........... | B62D 55/211 |

OTHER PUBLICATIONS

International Search Report dated Sep. 17, 2018.

(Continued)

*Primary Examiner* — Jason R Bellinger
(74) *Attorney, Agent, or Firm* — Preston Smirman; Smirman IP Law, PLLC (57) ABSTRACT

The invention discloses a track element (80) for forming a continuous over tyre track (100), includes a generally C-shaped rigid member (10) having a base portion (10a) extending transversely to the track (100), a tapered side guide member (10b) on each end of the base portion (10a), and at least one inter-engaging connector member (10c) on each side of the base portion (10a); wherein the rigid member (10) is encased in a coating of elastomeric material (20).

14 Claims, 10 Drawing Sheets

(56) References Cited

U.S. PATENT DOCUMENTS

| | | | | |
|---|---|---|---|---|
| 4,810,043 | A * | 3/1989 | McIntosh | B62D 55/04 |
| | | | | 305/15 |
| 5,988,776 | A * | 11/1999 | Zurn | B62D 55/04 |
| | | | | 305/111 |
| 6,203,127 | B1 | 3/2001 | Chapman | |
| 9,630,663 | B1 * | 4/2017 | Ward | B62D 55/28 |
| 2004/0016578 | A1 * | 1/2004 | St-Pierre | B62D 55/24 |
| | | | | 180/9.26 |
| 2006/0232130 | A1 * | 10/2006 | Hansen | B62D 55/04 |
| | | | | 305/200 |
| 2008/0035258 | A1 | 2/2008 | Koc | |

OTHER PUBLICATIONS

Written Opinion of International Searching Authority dated Sep. 17, 2018.
International Preliminary Report on Patentability dated Feb. 6, 2019.

* cited by examiner

TRACK ELEMENTS FOR FORMING A CONTINUOUS OVER TYRE TRACK WITH STRENGTH ENHANCEMENT STRUCTURE

CROSS-REFERENCE TO RELATED APPLICATION

The instant application is a national phase of PCT International Patent Application Serial No. PCT/MY2018/050033 filed May 22, 2018, and claims priority to Malaysia Patent Application Serial No. PI 2017701877 filed May 23, 2017 and Malaysia Patent Application Serial No. PI 2018701949 filed May 21, 2018, the entire specifications of all of which are expressly incorporated herein by reference.

FIELD OF INVENTION

The invention relates to vehicles equipped with rubber tyres used to drive over diverse types of terrain. More particularly the invention relates to a track element for a continuous tyre engaging rack for use by wheeled vehicles in general and in particular to wheeled vehicles equipped with rubber tyres to be efficiently operable in off-road terrain.

BACKGROUND OF THE INVENTION

Numerous types of vehicles are frequently used in terrain in which it is difficult for pneumatic or solid tyres to operate. Examples of such terrain include terrain that are very soft such as sandy surfaces and muddy terrain. Aforementioned vehicles include construction vehicles, agricultural vehicles, forestry vehicles and military vehicles which have to be retrofitted with a tyre engaging member to enhance traction and floatation on said terrain which include soft, slippery and/or uneven grounds such as soil, mud, sand, ice, snow, etc. on which they operate.

An example of a tyre engaging member that is conventionally utilized to adapt a vehicle equipped with rubber tyres for efficient operation on aforementioned soft, slippery and/or uneven grounds, is the tyre chain. Tyre chains have conventionally been used by cars, truck and other tyre mounted vehicles to improve traction of the vehicle with respect to the terrain it is traveling on. With regard to construction and other such tyre mounted vehicles (which include agricultural vehicles, forestry vehicles and military vehicles) in which a directional steering system is employed, because the center-lines of the front and rear tyres remain parallel and in line with each other at all times, the possibility of retro-fitting the vehicle with a multi-wheel tyre chain presents itself as a solution to improve the traction of the vehicle when the vehicle traverses over difficult terrain that include soft, slippery and/or uneven grounds among others. The tyre chain provides an improvement in operational performance in said difficult terrain by increasing the contact area of the vehicle with the ground it is traversing. This increased contact area hence improves traction between the vehicle and a terrain it is traversing on. Moreover the larger contact area spreads the weight of the vehicle over a larger surface area and hence further improves flotation of the vehicle over said terrain.

Tyre chains of the state of the art represent a type of metallic over tyre track assembly which comprises a plurality of metallic segments called "pads" that are mechanically pivot-ably interlinked to form a chain which is then snugly circumscribed over tyres of a given side of said given vehicle having a directional steering system in which center-lines of the front and rear tyres remain parallel and in line with each other at all times, even when said given vehicle is negotiating a turn. The "pad" in a tyre chain usually consists of a crossbar with two opposing sidewalls—one on each side of the crossbar. The sidewalls which are set perpendicular to the crossbar, create a valley or a groove. Hence, when so-called "pads" are connected together with links to comprise a chain, a continuous groove or channel is formed for tyres of a vehicle to ride within. The sidewalls of each pad keep the chain aligned with the tyres and at the same time prevent the tyres from derailing off the chain.

While tyre chains have been deployed successfully on construction vehicles like the skid steer loader and other such tyre mounted vehicles (which include agricultural vehicles, forestry vehicles and military vehicles) in which a directional steering system is employed and in which the center-lines of the front and rear tyres remain parallel and in line with each other at all times (i.e. even negotiating a turn), there is still room for improvement. More particularly, despite the improvement in vehicle traction and flotation provided by the deployment of multi-wheel tyre chains, the deployment of said multi-wheel tyre chains impose many drawbacks. Drawbacks of said multi-wheel tyre chains which represent a type of metal over tyre track assembly include the high levels of noise produced by vehicles equipped with said tyre chains when operational over difficult terrain, damage caused on paved roads and soil due to large weights and mechanical rigidity associated with said tyre chains, cumbersome and costly maintenance as well as high cost to manufacture.

Hence in view of the numerous drawbacks of multi-wheel tyre chains or metallic over tyre track assemblies, track assemblies for adapting directional drive tyre mounted vehicles such as skid steer loaders to traverse difficult terrain with improved traction and flotation have proliferated in the use rubber or elastomeric endless track assemblies over time. Elastomeric or rubber endless track assemblies, due to inherent elasticity of the rubber or elastomeric material enable a smoother more quitter operation of construction vehicles on difficult terrain. Moreover rubber or elastomeric endless track assemblies further enhance the ability of a given vehicle to readily absorb vibrations which consequently leads to a possibility of longer machinery life and lower overall machinery cost. Generally when alluding to the prior art with regard to rubber or elastomeric endless track assemblies, aforementioned rubber or elastomeric endless track assemblies are formed around an endless carcass or belt element having respective interior and exterior surfaces with a predetermined width dimension, said endless carcass further including terrain contacting lugs formed integrally with the exterior surface.

It is noted however, that the use of a rubber or elastomeric endless track assembly provides the disadvantage of lower mechanical strength as compared to metallic endless track assemblies. Moreover aforementioned rubber or elastomeric endless track assemblies of the prior art disclose track segments which comprise rubber or elastomeric pads bounded at symmetrically opposing sides with rubber or elastomeric side walls which consequently form a valley or groove which when assembled with a plurality of other identical rubber or elastomeric pads form a continuous channel for tyres of a vehicle to ride within, present the possible disadvantage of more frequent de-tracking of the tyres from the track assembly due to lower mechanical strength and elasticity of said rubber or elastomeric side walls and higher friction between the tyres of the vehicle and said side walls.

As a result, endless track assemblies of the state of the art usually comprise track segments which each comprise a composite assembly of elastomeric or rubber material and steel. Moreover there have been disclosed prior art endless track assemblies that comprise track segments that each include a pad member comprising elastomeric or rubber material impregnated with a reinforcing steel insert. Aforementioned configuration of pads of a given track segment of a given endless track assembly in which rubber or elastomeric material is impregnated with a solid planar reinforcing metallic or steel insert, presents the possibility of easy damage due to wear and tear that results from slipping between the impregnated reinforcing metallic or steel insert and the encapsulating rubber or elastomeric material that occurs when the track assembly is subjected to severe usage in difficult terrain that include rocky and muddy terrain. Moreover aforementioned configuration of pads due to being prone to damage due to aforementioned slipping between the impregnated reinforcing metallic or steel insert and the encapsulating elastomeric or rubber material, have reduced mechanical strength before failure as a useful track segment.

A further disadvantage of conventional endless track assemblies for adapting tyre mounted vehicles such as the skid steer loader and other such vehicles for use in difficult terrain which include muddy and rocky terrain is that there is no provision made for the quick and hassle free replacement of a faulty or damaged track assembly. Moreover such endless track assemblies would have to be completely replaced even if the extent of the damage is isolated to a relatively small portion of the track assembly. Hence, in some situations, it may be useful or necessary to quickly and conveniently install an endless track on a vehicle or remove and/or replace part of an endless track already installed on a vehicle. Therefore there is a need for an endless track assembly for use in adapting tyre mounted vehicles such as the skid steer loader and other such vehicles, which would simplify the installation and maintenance process and further minimize the occurrences of de-tracking. It would further be desirable if such rapidity and convenience with regard installation and maintenance be not detrimental to the track's performance.

Accordingly, in view of the abovementioned problems with regard to prior art endless track assemblies for use in adapting tyre mounted vehicles like the skid steer loader and other such vehicles for use in difficult terrain such as muddy and rocky terrain that require improved traction and flotation, it would be desirable if an improved endless track assembly be conceived.

SUMMARY OF INVENTION

It is an advantage of the invention to provide a continuous tyre engaging track that facilitates hassle free and simple installation and maintenance.

It is an advantage of the invention to provide a continuous tyre engaging track directed at mitigating if not eliminating the incidence of de-tracking.

It is an advantage of the invention to provide a continuous tyre engaging track that readily absorbs vibration and allows quiet and efficient operation of a wheeled vehicle in general and in particular a tyre mounted vehicle over difficult terrain that include muddy, sandy and rocky terrain among others.

It is advantage of the invention to provide a continuous tyre engaging track that provides improved mechanical strength and durability as compared to prior art continuous tyre engaging track.

In one aspect, the invention provides a track element for forming a continuous over tyre track, comprising a generally C-shaped rigid member having a base portion extending transversely to the track, a tapered side guide member on each end of the base portion, and at least one inter-engaging connector member on each side of the base portion; wherein the rigid member is encased in a coating of elastomeric material.

In accordance to an embodiment of the track element of the invention, the base portion of the generally C-shaped rigid member includes a plurality of perforations configured to allow passage and setting of elastomeric material therein during a moulding process.

In accordance to another embodiment of the track element of the invention, the tapered side guide member of the generally C-shaped rigid member also includes a plurality of perforations configured to allow passage and setting of elastomeric material therein during a moulding process.

In accordance to an embodiment of the track element of the invention, the generally C-shaped rigid member is made from material selected from a list that includes medium carbon steel, high carbon steel and manganese enriched steel.

In accordance to an embodiment of the track element of the invention, the elastomeric material is selected from a list of material that include poly-butadiene, styrene-butadiene and thermoplastic elastomers.

In accordance to an embodiment of the track element of the invention, the track element comprises an inner surface disposed with a generally parabolic curvature for gripping a tyre of a vehicle.

In accordance to an embodiment of the track element of the invention, the inner surface of the track element includes a drive engaging lug configured to provide traction between a tyre of a vehicle and the track element.

In accordance to an embodiment of the track element of the invention, the coating of elastomeric material encases the generally C-shaped rigid member of the track element such that a surface of a tapered side guide member on each end of the base portion is exposed.

In accordance to an embodiment of the track element of the invention, a plurality of the track elements are connected to one another to form a continuous tyre engaging track, each track element is connected to an adjacent one via the at least one inter-engaging connector utilizing an interlinking member to form a joint that is flexible in a width-wise direction of the continuous tyre engaging track.

In accordance to an embodiment of the track element of the invention, the track element further includes a rinsert comprising a friction reducing portion having a tyre engaging surface configured to reduce friction between a side of a tyre of a vehicle and the track element, and a track element engaging surface; and a securing portion disposed at opposed sides of the friction reducing portion that is configured to be slid-ably received by a track element such that the insert is snugly secured to the track element.

In accordance to an embodiment of the track element of the invention, the track element engaging surface of the insert engages a surface of a tapered side guide member.

In accordance to an embodiment of the track element of the invention, the securing portion of the insert, disposed at opposing sides of the friction reducing portion is configured to be slid-ably received by a tapered side guide member.

In accordance to an embodiment of the track element of the invention, the inter-engaging connector members are each separate components of generally U-shaped configuration having two free ends, each free end of the separate components being attached to the C-shaped rigid member in spaced relationship to one another so that a closed loop of each separate component protrudes from an edge of the track element, all the protruding loops being aligned so that attachment means can be passed through the protruding loops.

In accordance to an embodiment of the track element of the invention, the height of the tapered side guide member is within a range of substantially 150 mm to 190 mm for the complete cover of the full area of the friction reducing portion of the side guide member.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

The invention will now be described in greater detail, by way of example, with reference to the drawings.

Figure 1:
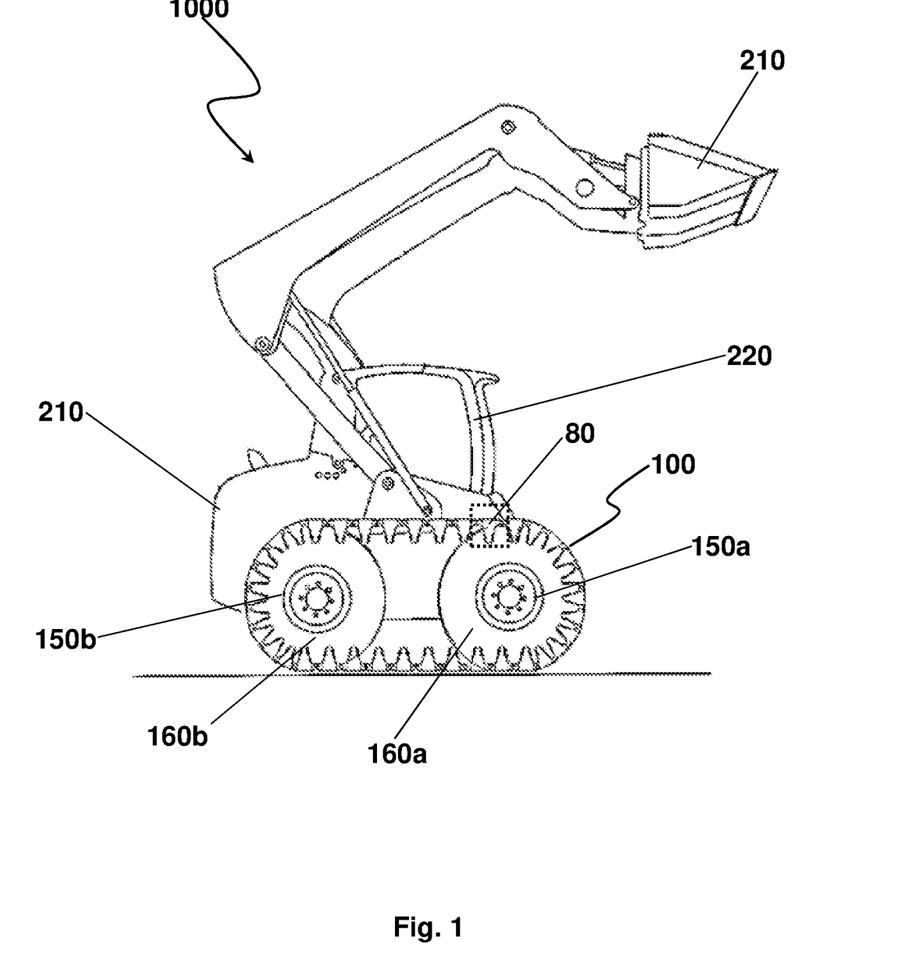
FIG. 1 is a diagram illustrating a side view of an exemplary wheel-driven vehicle that is retrofitted with a tyre engaging track utilizing a plurality of track elements.

Various aspects of the invention will now be described with reference to FIGS. 1 to 10 appended herein. With reference to FIG. 1, there is shown an exemplary tyre mounted vehicle 1000, retrofitted with a continuous over tyre track 100 comprising a plurality of track elements 80. The exemplary tyre-driven vehicle depicted in aforementioned FIG. 1 being a construction vehicle and more particularly being a skid steer loader. Aforementioned construction vehicle which represents an exemplary tyre-mounted vehicle 1000 comprises a frame supporting a prime mover (not explicitly indicated in FIG. 1 appended herein), a working implement 210, a pair of drive wheels 150a, 150b disposed on either side of the vehicle 1000 which are connected to a power train which serves to transmit mechanical torque from the prime mover to said pair of drive wheels 150a, 150b, a pair of continuous over tyre tracks 100 that are respectively mounted over a given pair of drive wheels 150a, 150b on a given side of the vehicle 1000, an operator cabin 220 which includes vehicle controls that enable an operator to manipulate the working implement 210 and move the vehicle 1000 on the ground to perform construction work.

Exemplarily, the prime mover may comprise an internal combustion engine and/or one or more other types of motors (e.g., electric motors, etc.) for generating motive power to move the vehicle 1000. As mentioned in a preceding passage, the motive power generated by the prime mover is transmitted to the pair of drive wheels 150a, 150b on a given side of the vehicle 1000 via a power transmission train. In order to enable the vehicle to adaptably be retrofitted with continuous over tyre tracks 100, each pair of drive wheels 150a, 150b on a given side of the vehicle 1000 has an independent drive system comprising of a prime mover and a drive or power transmission train. The pair of drive wheels 150a, 150b disposed on a given side of the vehicle 1000, are drive wheels 150a, 150b mounted on by a tyre 160a, 160b. In normal operation of the vehicle 1000, the tyres 160a, 160b mounted on the wheels 150a, 150b enable traction of the vehicle 1000 on the ground surface. This traction is due to friction between the tyres 160a, 160b of the vehicle 1000 and the ground surface and consequently enables propelling the vehicle 1000 for travel over the ground surface. However in difficult terrain that may include sandy and muddy terrain, the tyres 160a, 160b of the drive wheels 150a, 150b due to a small surface area of the tyres 160a, 160b, provides poor traction with respect to the ground surface, thus giving rise to inefficient operation of the vehicle 1000 due to inefficient transformation of motive power transmitted to the drive wheels 150a, 150b and hence the tyres 160a, 160b mounted over said drive wheels 150a, 150b of the vehicle 1000.

Hence for travel over difficult terrain such as muddy and sandy terrain, the vehicle 100 is retrofitted with an over tyre continuous track 100, which circumscribe the tyres 160a, 160b and hence are mounted over the drive wheels 150a, 150b of the vehicle 1000. The over tyre continuous track 100 comprises a plurality of track elements 80, each track element 80 is connected to an adjacent one at a joint that is flexible in a width-wise direction of the over tyre continuous track 100, and is configured to adapt the vehicle 1000 for efficient travel over diverse terrain that include difficult terrain such as sandy and muddy terrain. With regard to traction of the vehicle 1000 when retrofitted with the over tyre continuous track, the motive power generated by a prime mover is transmitted to the drive wheels 150a, 150b and hence tyres 160a, 160b mounted over said drive wheels 150a, 150b on either side of the vehicle 1000. This motive power is subsequently transmitted by the tyres 160a, 160b to the over tyre continuous track 100 on either side of the vehicle 1000 by way of traction between the tyres 160a, 160b and the interior surface of the over tyre continuous track 100 which results in rotation of the endless track assemblies 100 disposed on either side of the vehicle 1000 and propulsion and travel of the vehicle 1000 on the ground surface due to traction between an outer surface of the over tyre continuous track 100 and the ground surface.

More particularly with reference to FIGS. 1 to 4 and 7 to 9, each track element 80 comprises a generally C-shaped rigid member 10 having a base portion 10a extending transversely to the track 100, a tapered side guide member 10b on each end of the base portion 10a, and at least one inter-engaging connector member 10c on each side of the base portion 10a; wherein the rigid member 10 is encased in a coating of elastomeric material 20.

Figure 3:
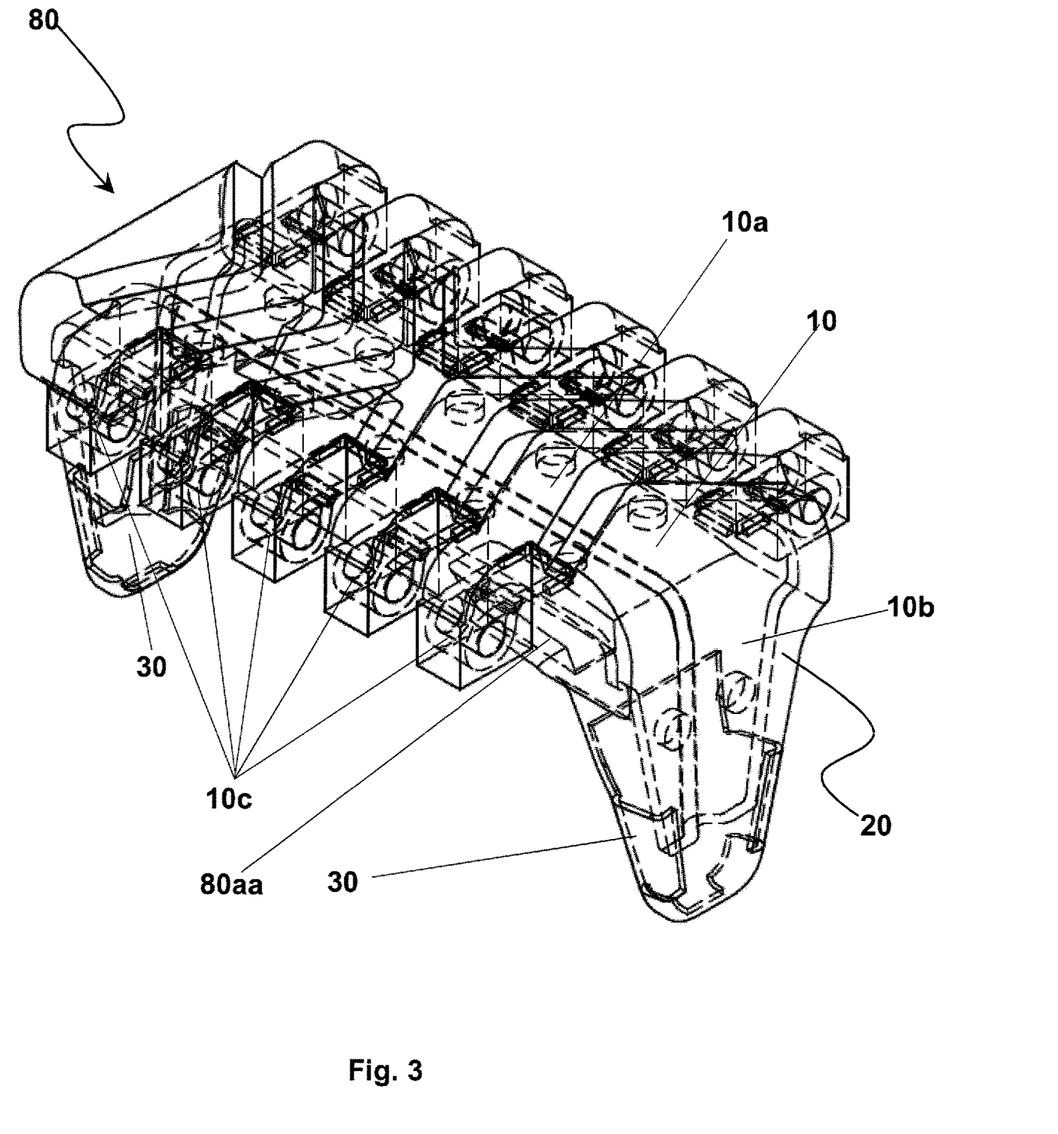
FIG. 3 is a wire mesh line drawing illustrating perspective view of a track element of the tyre engaging track.
Figure 4:
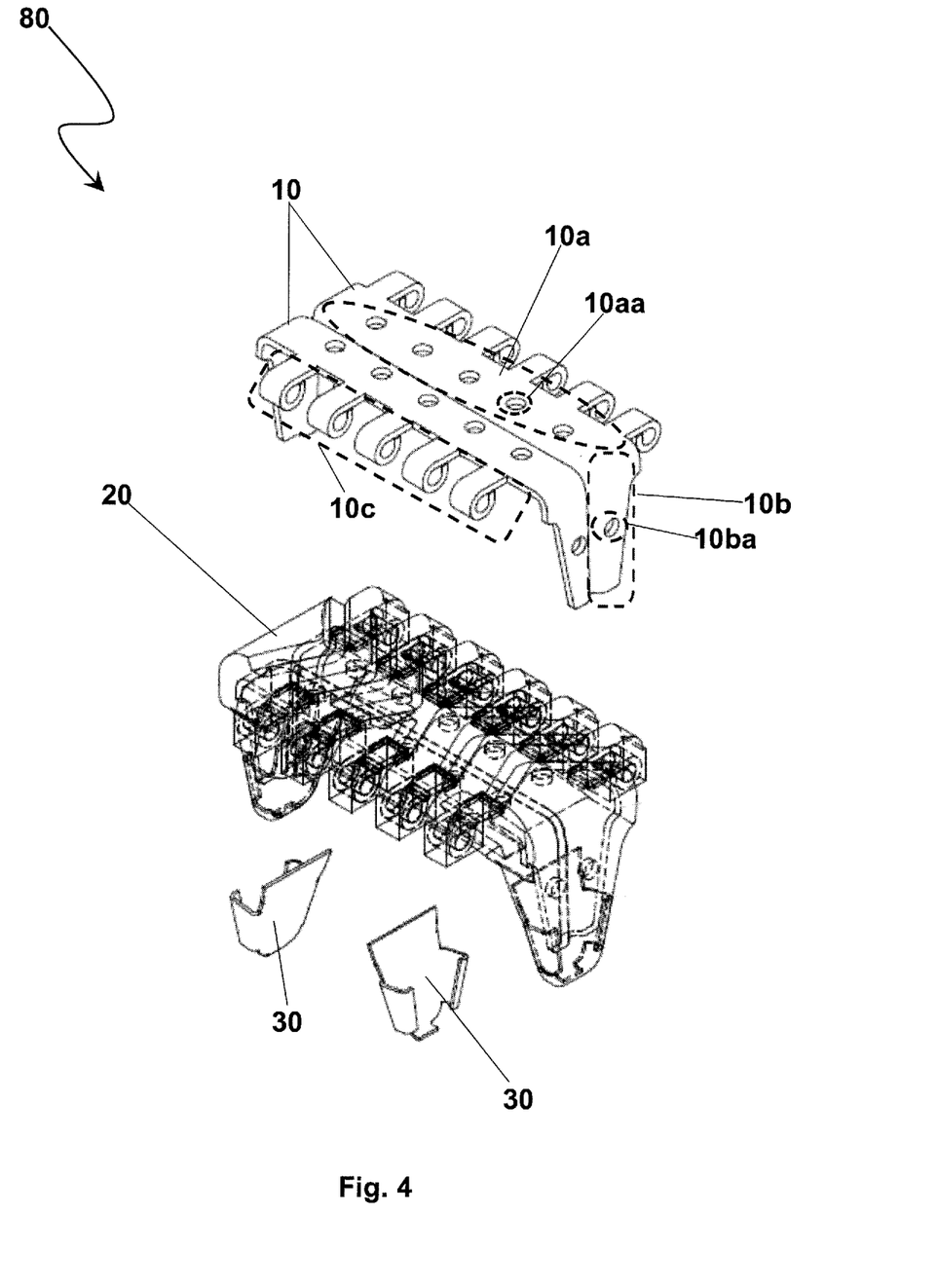
FIG. 4 is a drawing illustrating an exploded view of a track element of the tyre engaging track.

With reference to FIGS. 3 and 4, the track element 80 comprises a pair of generally C-shaped rigid members 10 disposed back to back, with the pair generally C-shaped rigid members 10 encased in a coating of elastomeric material 20. The pair of generally C-shaped rigid members 10 disposed back to back as illustrated in FIGS. 3 and 4. Each of aforementioned C-shaped rigid members 10 includes a base portion 10a extending transversely to the track 100, a tapered side guide member 10b on each end of the base portion 10a, and one inter-engaging connector member 10c on each side of the base portion 10a. Such an arrangement may provide the advantage of being less rigid and hence a bit more flexible, thus mitigating of preventing damage to a given track element 80. Alternatively, the C-shaped rigid member 10 comprises a pair of inter-engaging connector members 10c disposed at the sides of the base portion 10a, this would advantageously provide more rigidity to the track element 80 and enhance traction of the track element 80 when navigating over muddy and sandy terrain.

With reference to the preceding paragraph and FIGS. 1 to 4 and 6 to 9 appended herein, the generally C-shaped rigid member 10 is configured to reinforce the track element 80, with the base portion reinforcing the substantially planar portion of the track element 80 which comprises an inner surface 80a configured to engage a tyre 160a, 160b of a vehicle 1000 and an outer ground engaging surface 80b configured to engage the ground surface. The tapered side guide member 10b of the generally C-shaped rigid member 10, disposed at the ends of the base portion 10a on the other hand, serves primarily, to guide a track element 80 of an over tyre continuous track 100 mounted on tyres 160a, 160b of a tyre mounted vehicle 1000, for motion along a surface of the tyre 160a, 160b, while the inter-engaging connector member 10c is configured to allow interconnection of the track element 80 to an adjacent track element 80 of an over tyre continuous track 100.

The elastomeric material 20 encasing the generally C-shaped rigid member 10 is configured among others to advantageously dampen mechanical vibrations subjected to the track element 80 during travel of a tyre mounted vehicle 1000 over rocky and rough terrain.

The track element 80 has an inner surface 80a for engaging a tyre of a vehicle 1000 and an outer ground engaging surface 80b for engaging the ground surface. The inner surface 80a further including a pair of tyre engaging lugs 80aa disposed therein. Aforementioned tyre engaging lugs 80aa is configured to engage the tyre 160a, 160b to thus enable traction of the track elements 80 over a ground surface. Moreover, the inner surface 80a of each track element 80 has an inwards curved surface such that said inner surface 80a has a generally parabolic curvature. This configuration of the inner surface 80a, allows for better gripping and hence traction of the tyre 160a, 160b on the over tyre continuous track 100.

Alternatively, the generally C-shaped member 10 can be coated in a way such that each inner surface of the tapered side guide member 10b is exposed. This provides the advantage of reducing friction between a track element 80 and the tyre 160a, 160b.

Figure 2A:
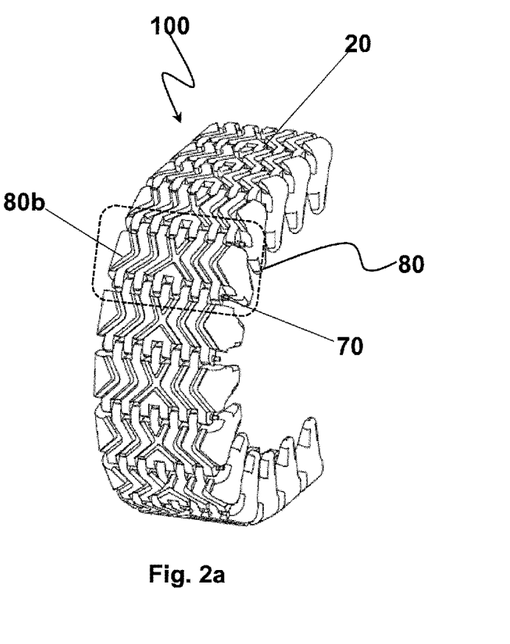
FIGS. 2a, 2b, & 2c are drawings illustrating various partial perspective views of a tyre engaging track assembled utilizing the track elements.
Figure 2B:
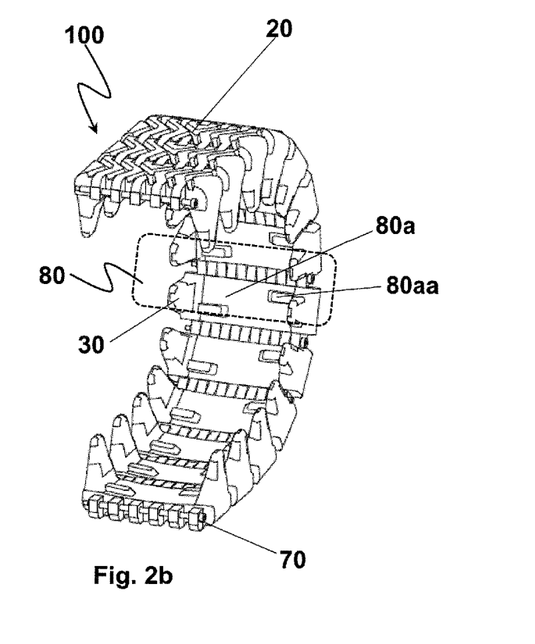
Figure 2C:
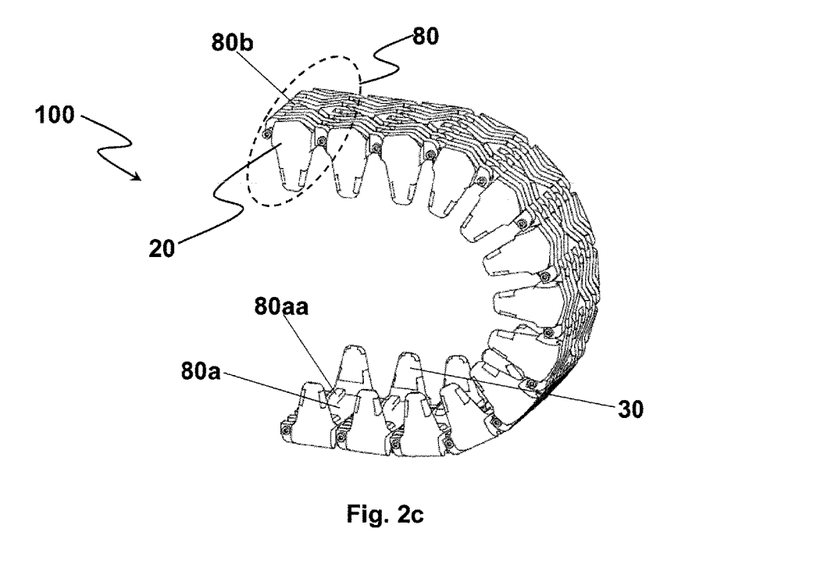

With reference to FIGS. 2 to 4, the base portion 10a and the tapered side guide member 10b include a plurality of perforations 10aa configured to allow passage and setting of elastomeric material 20 therein during a moulding process. The inclusion of perforations 10aa, 10ba serve to provide improved mechanical strength and mechanical integrity to the track element 80 and hence improve durability of the track element 80.

The generally C-shaped rigid member 10 can be made of steel material such as medium carbon steel, high carbon steel and manganese enriched steel. The elastomeric material 20 can be made of poly-butadiene, styrene-butadiene or thermoplastic elastomers.

Figure 5:
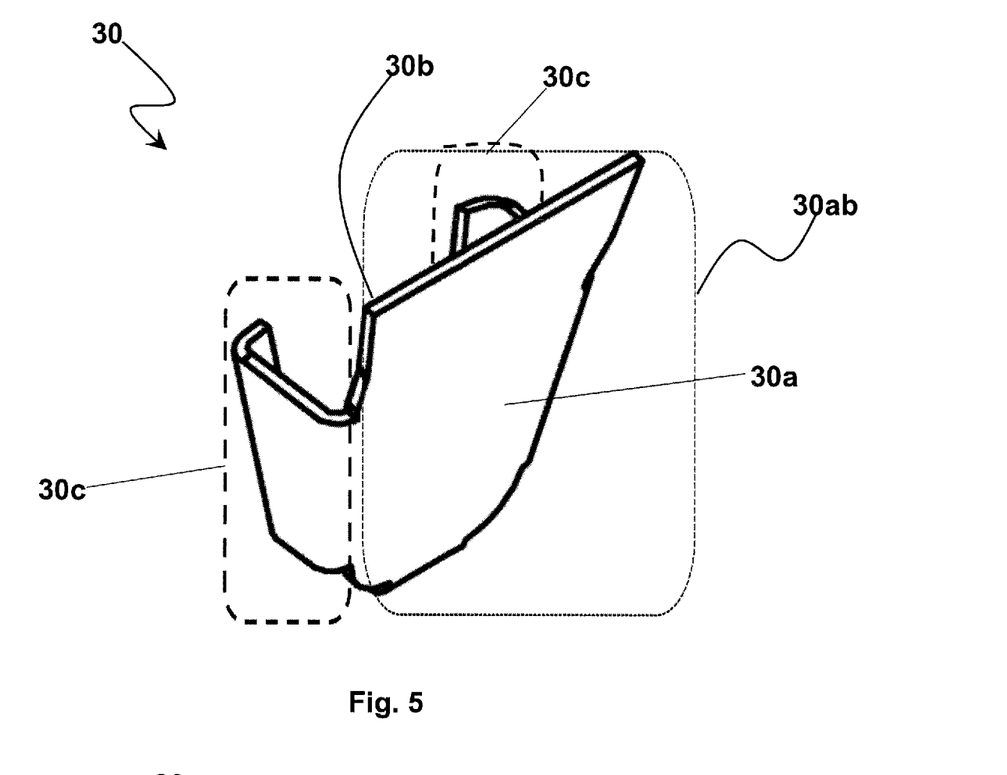
FIG. 5 is a drawing illustrating a perspective view of a tyre support friction reducing member of the tyre engaging endless track.
Figure 6:
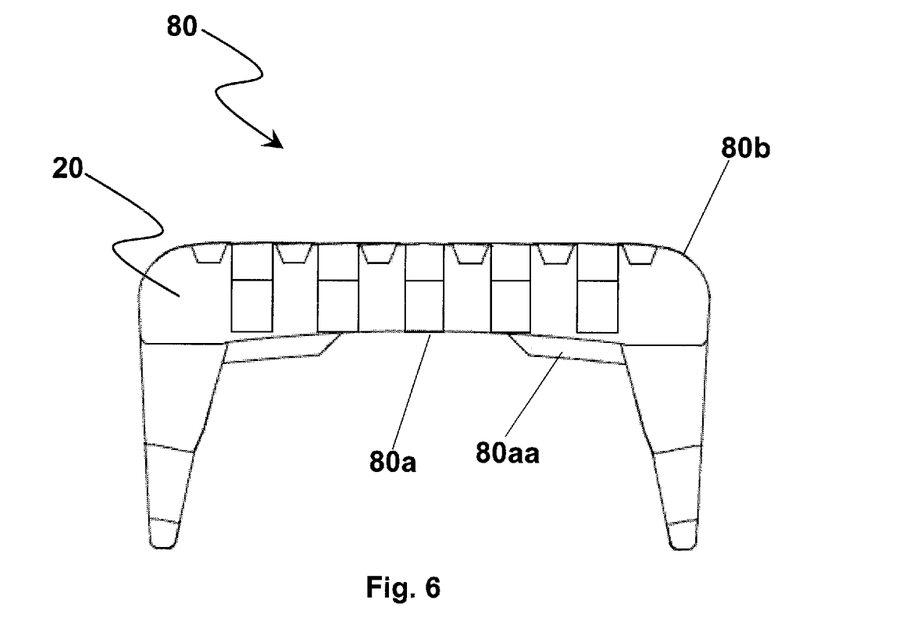
FIG. 6 is a drawing illustrating a front view of a track element of the tyre engaging endless track.
Figure 7:
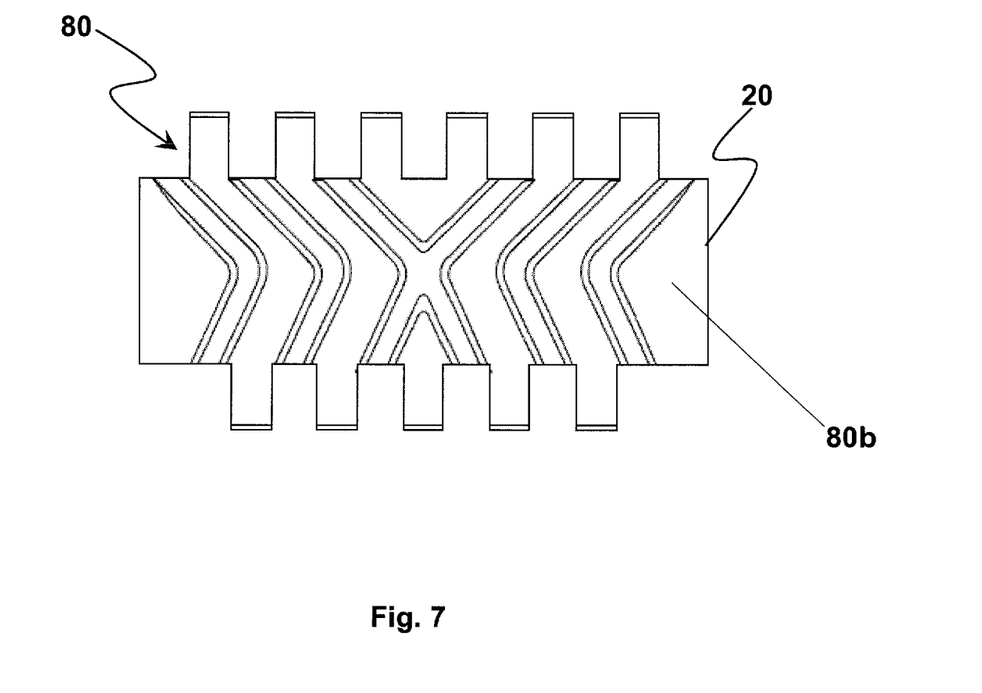
FIG. 7 is a drawing illustrating a top view of the track element illustrated in FIG. 6, of the tyre engaging track.
Figure 8:
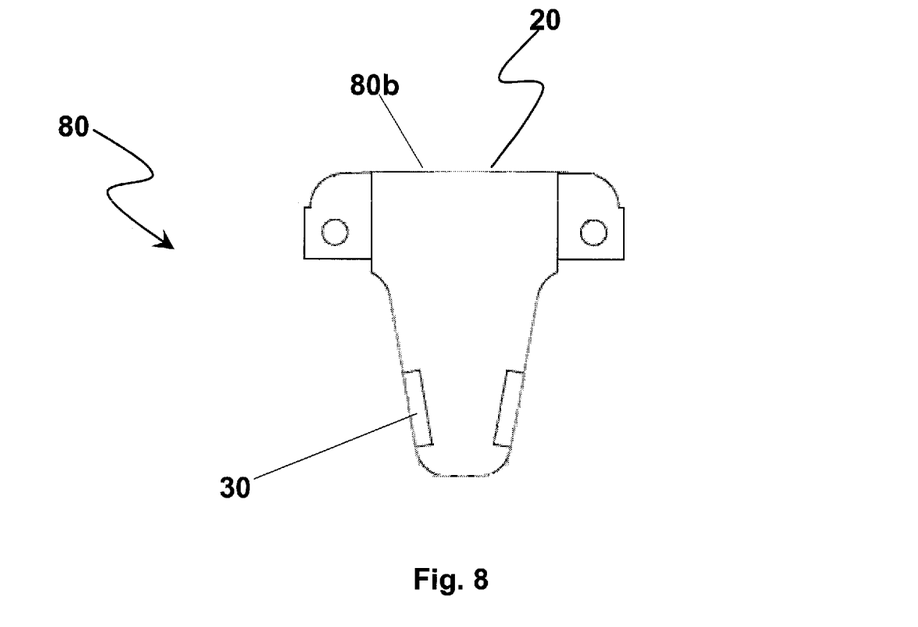
FIG. 8 is a drawing illustrating a side view of the track element illustrated in FIG. 6, of the tyre engaging track.
Figure 9:
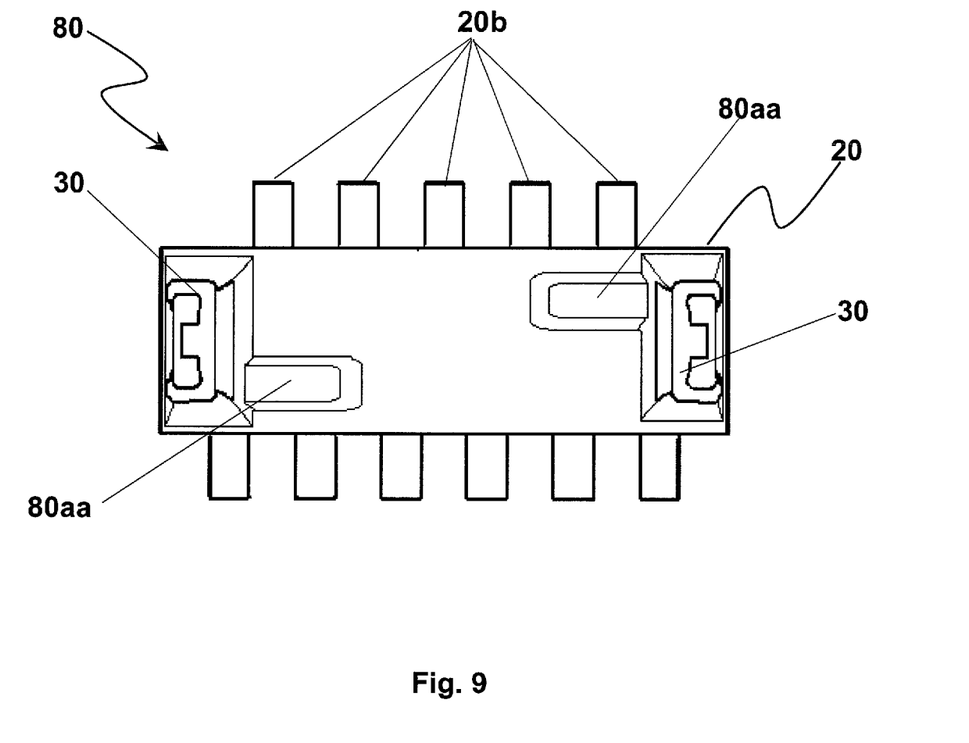
FIG. 9 is a drawing illustrating a bottom view of the track element illustrated in FIG. 6, of the tyre engaging track.
Figure 10:
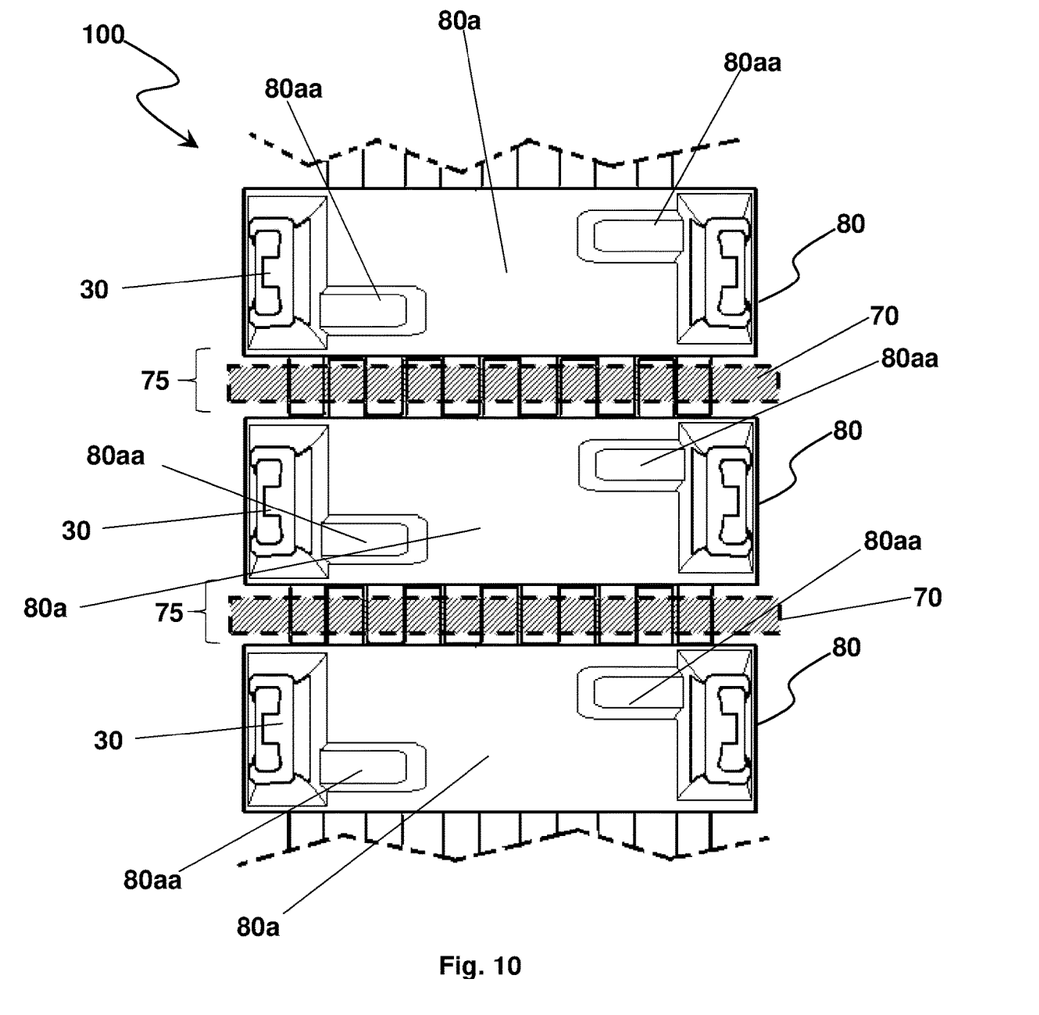
FIG. 10 is a drawing illustrating a partial top view of the inner surface of a tyre engaging track comprising of a plurality of track elements connected to one another.

With reference to FIG. 5, the track element 80 further comprises a insert 30 including a friction reducing portion 30ab having a tyre engaging surface 30a configured to reduce friction between the side of the tyre and the inner surface of the track element 80; and a securing portion 30c disposed at opposed sides of the friction reducing portion 30ab that is configured to be slidably received by the track element 80 such that the insert 30 is snugly secured to the track element 80.

With reference to FIGS. 1 to 10, The plurality of the track elements 80 are inter-connected to one another continuously to form the tyre engaging track 100, each track element 80 is connected to an adjacent one via the at least one inter-engaging connector 10c utilizing an interlinking member 70 to form a joint 75 that can be flexible in a width-wise direction of the continuous tyre engaging track 100.

Figure 11:
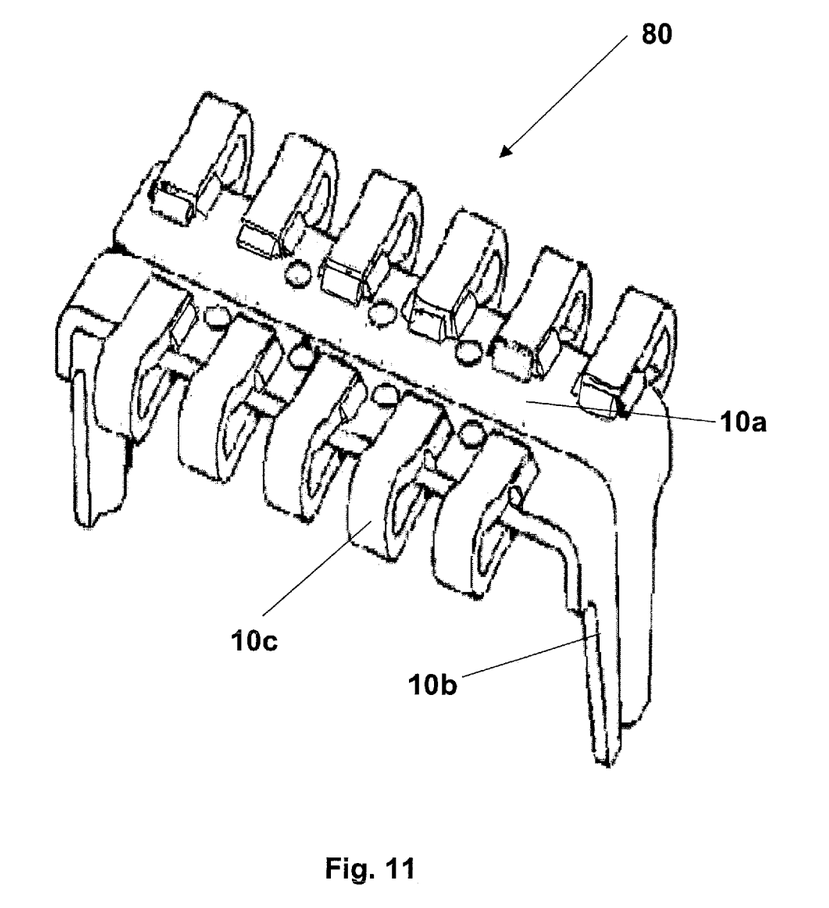
FIG. 11 is a drawing illustrating the track element with strength enhancement structure.

With reference to FIG. 11, another embodiment of the track element 80 with structure strength enhancement is illustrated. The track element 80 comprises a generally C-shaped rigid member 10 having a base portion 10a extending transversely to the track, when correctly fitted 100, a tapered side guide member 10b on each of the base portion 10a and at least one inter-engaging connector member 10c on each of the base portion 10a, wherein the inter-engaging connector members 10c are each separate components of generally U-shaped configuration, each of the separate component being attached to the C-shaped rigid member 10 in spaced relationship to one another so that a closed loop of each separate component protrudes from an edge of the track element, all the protruding loops being aligned so that attachment means can be passed through the protruding loops.

Preferably, the track elements 80 are secured together in series such that the protruding loops of one track element are interdigitated with the protruding loops of a next succeeding track element and wherein each set of interdigitate loops are secured together so that connected track elements can be hinged relative to one another. The U-shaped configuration of the inter-engaging connector members 10c provides a larger surface in-contact with the C-shaped rigid member 10 for exerting a stronger holding force between the inter-engaging connector members 10c and the C-shaped rigid member 10.

Figure 12:
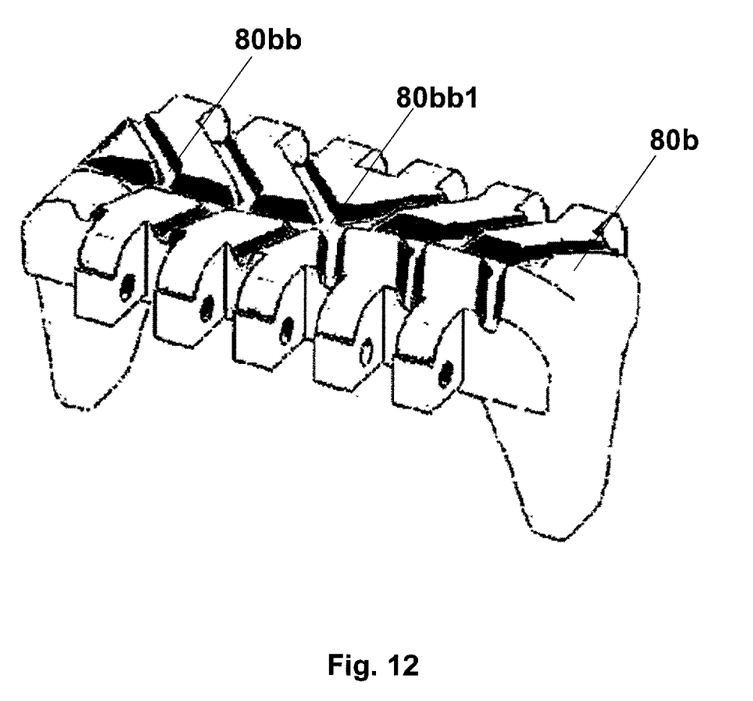
FIG. 12 is a drawing illustrating the tread surface of the ground-engaging surface of the track elements.

Preferably, the height of the tapered side guide member is within a range of substantially 150 mm to 190 mm to cover substantially completely the full area of the friction reducing portion 30ab of the insert. As a result, the unnecessary friction between the tyre and the track elements 80 is eliminated by the complete cover of the friction reducing portion 30ab and thus the life cycle of both the tyre and track elements 80 can be prolonged. Further, to enhance the gripping of the track elements 80 over the ground surface, the outer ground engaging surface 80*b* has a plurality of grooves 80*bb* extending diagonally from the spacing between each inter-engaging connector members 10*c* towards the central of the outer ground engaging surface 80*b* as illustrated in FIG. 12. Each grooves 80*bb* intersect over a horizontal grooves 80*bb*1 which lies across the longitudinal axis of the outer ground engaging surface 80*b*. Such grooves 80*bb* will helps in displacing water when the vehicle travels along a water path and thus provides greater grip force to the ground surface.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. A track element for forming an endless caterpillar track, comprising:
    a generally C-shaped rigid member having a base portion extending transversely to the track;
    a tapered side guide member on each end of the base portion; and
    at least one inter-engaging connector member on each side of the base portion; wherein the rigid member is encased in a coating of elastomeric material which entirely covers the rigid member;
    wherein the track element comprises an inner surface disposed with a generally parabolic curvature for gripping a tyre of a vehicle;
    wherein the inner surface of the track element includes a drive engaging lug configured to provide traction between the tyre of the vehicle and the track element.

2. The track element according to claim 1, wherein the base portion includes a plurality of perforations configured to allow passage and setting of elastomeric material therein during a moulding process.

3. The track element according to claim 1, wherein the tapered side guide member includes at least one perforation configured to allow passage and setting of elastomeric material therein during a moulding process.

4. The track element according to claim 1, wherein a surface of the tapered side guide member of the generally C-shaped rigid member is not covered in elas-tomeric material.

5. The track element according to claim 1, wherein the coating of elastomeric material is selected from a list of material that include poly-butadiene, styrene-butadiene and thermoplastic elastomers.

6. The track element according to claim 1, wherein the C-shaped rigid member is made from material selected from a list that includes medium carbon steel, high carbon steel and manganese enriched steel.

7. The track element according to claim 1, wherein a plurality of the track elements are connected to one another to form a continuous tyre engaging track, each track element is connected to an adjacent one by the at least one inter-engaging connector to form a joint that is flexible in a width-wise direction of the continuous tyre engaging track.

8. The track element according to claim 1, wherein the base portion and the tapered side guide members are profiled with at least one groove on a surface of the base portion and the tapered side guide members respectively for strengthening their respective structure.

9. The track element according to claim 1, wherein the track element further comprises an insert including:
    a friction reducing portion having a tyre engaging surface configured to reduce friction between a side of the tyre of the vehicle and the track element, and a track element engaging surface; and
    a securing portion disposed at opposed sides of the friction reducing portion that is configured to be slid-ably received by the track element such that the insert is secured to the track element.

10. The track element according to claim 9, wherein the track element engaging surface engages a surface of the tapered side guide member.

11. The track element according to claim 9, wherein the securing portion disposed at opposing sides of the friction reducing portion is configured to be slid-ably received by the tapered side guide member.

12. The track element according claim 1, wherein the inter-engaging connector members are each separate components of generally U-shaped configuration having two free ends, each free end of the separate components being attached to the C-shaped rigid member in spaced relationship to one another so that a closed loop of each separate component protrudes from an edge of the track element, and all the protruding loops are being aligned.

13. The track element according to claim 9, wherein the height of the tapered side guide member is within a range of substantially 150 mm to 190 mm for the complete cover of the full area of the friction reducing portion of the side guide member.

14. The track element according to claim 1, further comprising an insert having:
    a friction reducing portion having a tyre engaging surface configured to reduce friction between a side of the tyre of the vehicle and the track element, and a track element engaging surface; and
    a securing portion disposed at opposed sides of the friction reducing portion that is configured to be slid-ably received by the track element such that the insert is secured to the track element;
    wherein the height of the tapered side guide member is within a range of substantially 150 mm to 190 mm to cover substantially completely the full area of the friction reducing portion of the insert.

* * * * *